US006304959B1

United States Patent
Konigsburg et al.

(10) Patent No.: US 6,304,959 B1
(45) Date of Patent: Oct. 16, 2001

(54) SIMPLIFIED METHOD TO GENERATE BTAGS IN A DECODE UNIT OF A PROCESSING SYSTEM

(75) Inventors: Brian R. Konigsburg, Austin; John Edward Derrick, Round Rock; David Stephen Levitan, Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/263,669

(22) Filed: Mar. 5, 1999

(51) Int. Cl.[7] ........................................ G06F 9/38
(52) U.S. Cl. .......................... 712/233; 712/215
(58) Field of Search ................... 712/206, 207, 712/209, 213, 215, 233

(56) References Cited

U.S. PATENT DOCUMENTS

| 5,742,783 | 4/1998 | Azmoodeh et al. | 712/212 |
| 5,822,575 | * 10/1998 | Tran | 395/586 |
| 5,930,508 | 7/1999 | Faraboschi et al. | 717/6 |
| 5,961,636 | * 10/1999 | Brooks et al. | 712/228 |
| 6,044,450 | 3/2000 | Tsushima et al. | 712/24 |
| 6,092,176 | 7/2000 | Iadonato et al. | 712/23 |
| 6,108,774 | * 8/2000 | Muthusamy | 712/240 |
| 6,170,051 | 1/2001 | Dowling | 712/225 |

* cited by examiner

Primary Examiner—John A. Follansbee
(74) Attorney, Agent, or Firm—Sawyer Law Group LLP; Anthony V. S. England

(57) ABSTRACT

A method and system for assigning unique branch tag (BTAG) values in a decode unit in a processing system are disclosed. The method and system comprise providing at least one BTAG value and incrementing the at least one BTAG value for each fetch group as required. The method includes allowing the decode unit to generate the appropriate BTAG values for all dispatch groups formed by instructions within the same fetch group. In the preferred implementation, the BTAG values comprise a major branch tag and two minor branch tags, a count branch tag, and a link branch tag. The "seed" value for each of the BTAGs is provided each time a branch redirection occurs. Because the branches are passed to the decode unit with little or no processing by the instruction fetch unit, and conditions can cause the branch execution to be delayed, more branches could be decoded and processed than the number of branch entry queues in the instruction fetch unit. Therefore the value of the next entry in the branch entry queue is broadcast to the decode unit and whenever the current branch in the last stage of the decode unit is identical to the broadcast value, the decode unit ceases to process any output instructions until the broadcast value changes.

4 Claims, 4 Drawing Sheets

SIMPLIFIED METHOD TO GENERATE BTAGS IN A DECODE UNIT OF A PROCESSING SYSTEM

CROSS-REFERENCE TO RELATED APPLICATIONS

The present application is related to applications Ser. No. 09/263,663, entitled "A Method and System for Optimizing the Fetching of Dispatch Groups in a Superscalar Processor", filed Mar. 5, 1999; Ser. No. 09/263,667, entitled "An Instruction Buffer Arrangement for a Superscalar Processor", filed Mar. 5, 1999; Ser. No. 09/263,664, entitled "Decode Scheme for the Optimization of Accessing Constrained or Volatile Storage", filed Mar. 5, 1999; Ser. No. 09/263,666, entitled "Destructive Operation Optimization for Operations Which Modify Partial Datums", filed Mar. 5, 1999; Ser. No. 09/263,670, entitled "Fast Microcode/Branch Selector Scheme", filed Mar. 5, 1999; and Ser. No. 09/263,668, entitled "A System and Method for Utilizing a Conditional Split for Aligning Internal Operations (IOPs) for Dispatch", filed Mar. 5, 1999.

FIELD OF THE INVENTION

The present invention relates generally to a deeply pipelined superscalar processor and more particularly to one which employs aggressive branch and fetch prediction mechanisms.

BACKGROUND OF THE INVENTION

Superscalar processors employ aggressive techniques to exploit instruction-level parallelism. Wide dispatch and issue paths place an upper bound on peak instruction throughput. Large issue buffers are used to maintain a window of instructions necessary for detecting parallelism, and a large pool of physical registers provides destinations for all of the in-flight instructions issued from the window beyond the dispatch boundary. To enable concurrent execution of instructions, the execution engine is composed of many parallel functional units. The fetch engine speculates past multiple branches in order to supply a continuous instruction stream to the decode, dispatch, and execution pipelines in order to maintain a large window of potentially executable instructions.

The trend in superscalar design is to scale these techniques: wider dispatch/issue, larger windows, more physical registers, more functional units, and deeper speculation. To maintain this trend, it is important to balance all parts of the processor-any bottlenecks diminish the benefit of aggressive techniques.

Instruction fetch performance depends on a number of factors. Instruction cache hit rate and branch prediction accuracy have been long recognized as important problems in fetch performance and are well-researched areas.

Modern microprocessors routinely use a plurality of mechanisms to improve their ability to efficiently fetch past branch instructions. These prediction mechanisms allow a processor to fetch beyond a branch instruction before the outcome of the branch is known. For example, some mechanisms allow a processor to speculatively fetch beyond a branch before the branch's target address has been computed. These techniques use run-time history to speculatively predict which instructions should be fetched and eliminate "dead" cycles that might normally be wasted. Even with these techniques, current microprocessors are limited in fetching instructions during a clock cycle. As superscalar processors become more aggressive and attempt to execute many more instructions per cycle, they must also be able to fetch many more instructions per cycle.

High performance superscalar processor organizations divide naturally into an instruction fetch mechanism and an instruction execution mechanism. The fetch and execution mechanisms are separated by instruction issue buffer(s), for example, queues, and reservation stations, etc. Conceptually, the instruction fetch mechanism acts as a "producer" which fetches, decodes, and places instructions into a reorder buffer. The instruction execution engine "prepares" instructions for completions. The completion engine is the "consumer" which removes instructions from the buffer and executes them, subject to data dependence and resource constraints. Control dependencies (branches and jumps) provide a feedback mechanism between the producer and consumer.

As instruction fetch decode and dispatch pipelines become wider, it becomes important to optimize the translation from the complex instruction set with a large amount of implicit information to an explicit instruction set that does not require the use of architected registers. This is particularly true in situations where the internal instructions do not have a direct one to one relationship to the external instructions. This is typically done to facilitate faster cycle times, simplify design or reduce the execution and/or register resources required for that instruction's execution. This uneven expansion of instructions as they flow down the pipeline have the side effect of making it extremely difficult to track and correlate instructions in the fetch unit and the decode unit after they have been expanded.

As processors are optimized for higher frequency operation they are being implemented with more pipeline stages. This along with a requirement for more accurate branch and fetch prediction forces increased instructions to be passed further down the processor pipeline before fetch predictors or branch predictors can be resolved.

Speculative branch prediction requires that each branch instruction is denoted by some unique value or enumeration to allow canceling out instructions which were fetched, passed down the pipeline and then determined not to be from the proper instruction stream. Some processor architectures distinguish different branch types from one another, in this case multiple "branch tags" would be required.

Accordingly, what is needed is a mechanism for forming independently generated identifying branch tags in multiple units which can be used to track, flush, and cancel fetch groups and portions of fetch groups upon resolution of the fetch and branch predictors. The present invention addresses such a need.

SUMMARY OF THE INVENTION

A method and system for assigning unique branch tag (BTAG) values in a decode unit in a processing system are disclosed. The method and system comprise providing at least one BTAG value and incrementing the at least one BTAG value for each fetch group as required. The method includes allowing the decode unit to generate the appropriate BTAG values for all dispatch groups formed by instructions within the same fetch group.

In the preferred implementation, the BTAG values comprise a major branch tag and two minor branch tags, a count branch tag, and a link branch tag. The "seed" value for each of the BTAGs is provided each time a branch redirection occurs. Because the branches are passed to the decode unit with little or no processing by the instruction fetch unit, and conditions can cause the branch execution to be delayed, more branches could be decoded and processed than the number of branch entry queues in the instruction fetch unit. Therefore the value of the next entry in the branch entry queue is broadcast to the decode unit and whenever the current branch in the last stage of the decode unit is identical to the broadcast value, the decode unit ceases to process any output instructions until the broadcast value changes.

DETAILED DESCRIPTION OF THE INVENTION

The present invention relates generally to a superscalar processor and more particularly to a system and method for improving the overall throughput in such a processor. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

A superscalar processor includes a number of stages, such as the following, in the processor pipeline. In a typical first stage, referred to as an instruction fetch stage, an instruction is fetched from memory or associative memory structure, each stage including one or more pipelines. Then, in the decode stage, the instruction is decoded into different control bits, which in general designate (1) a type of functional unit for performing the operation specified by the instruction, (2) source operands for the operation, and (3) destinations for results of operations.

In a dispatch stage, the decoded instruction is dispatched per the control bits to a unit having an execution stage, or possibly to an intervening reservation station, which ultimately issues the instruction to an associated execution stage (also "execution unit").

The execution stage processes the operation as specified by the instruction. Executing an operation specified by an instruction includes accepting one or more operands and producing one or more results. Oftentimes the instructions will be executed out-of-order.

A completion stage deals with program order issues that arise from concurrent execution, wherein multiple, concurrently executed instructions may deposit results in a single register. It also handles recovery issues arising from instructions subsequent to an interrupted instruction depositing results in their destination registers.

Figure 1:
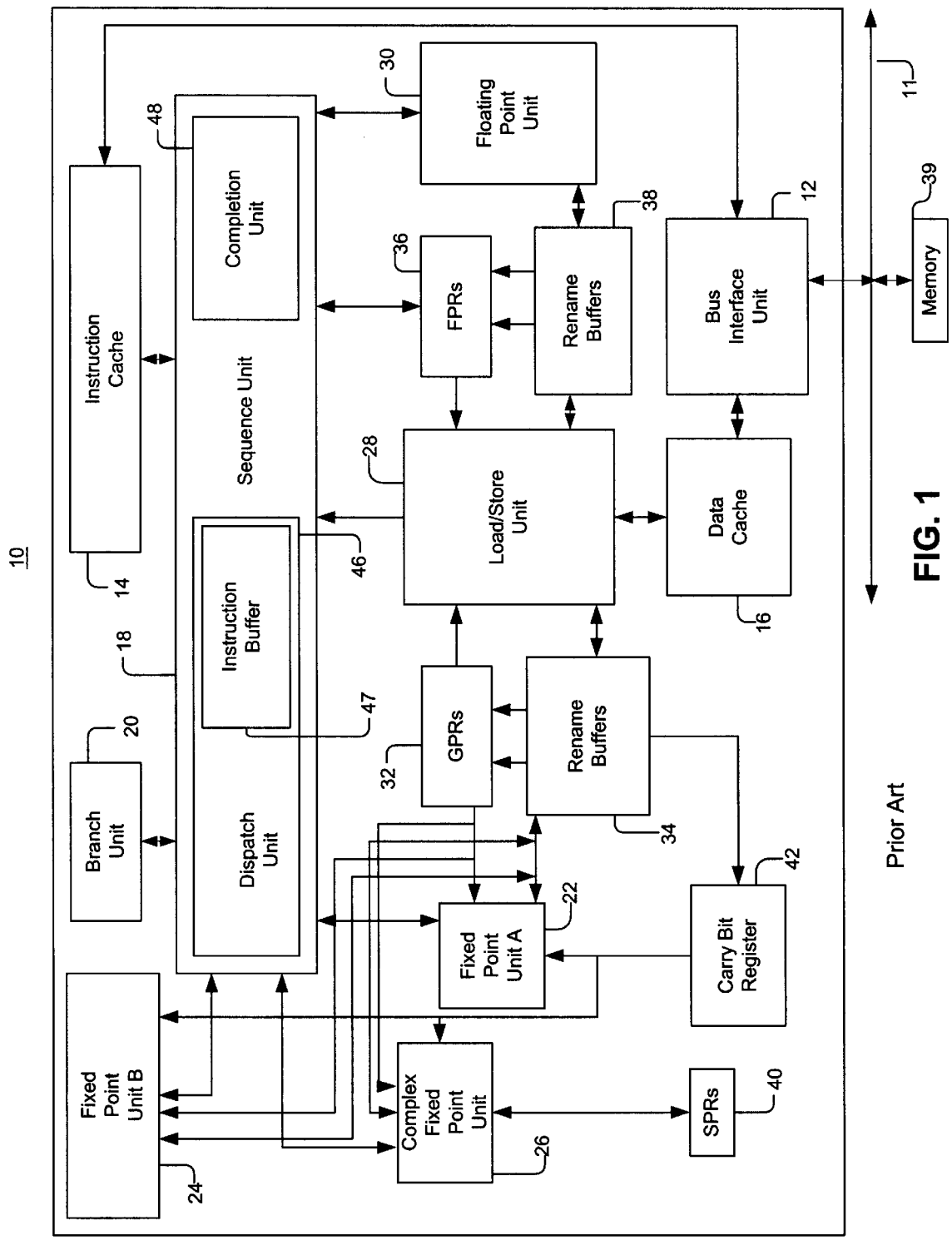
FIG. 1 is a block diagram of a conventional superscalar processor.

FIG. 1 is a block diagram of a conventional superscalar processor 10. As shown, the superscalar processor 10 typically include a system bus 11 connected to a bus interface unit ("BIU") 12. BIU 12 controls the transfer of information between processor 10 and system bus 11. BIU 12 is connected to an instruction cache 14 and to a data cache 16 of processor 10. Instruction cache 14 outputs instructions to a sequencer unit 18. In response to such instructions from instruction cache 14, sequencer unit 18 selectively outputs instructions to other execution circuitry of processor 10.

In addition to sequencer unit 18 which includes execution units of a dispatch unit 46 and a completion unit 48, in the preferred embodiment the execution circuitry of processor 10 includes multiple execution units, namely a branch unit 20, a fixed point unit A ("FXUA") 22, a fixed point unit B ("FXUB") 24, a complex fixed point unit ("CFXU") 26, a load/store unit ("LSU") 28 and a floating point unit ("FPU") 30. FXUA 22, FXUB 24, CFXU 26 and LSU 28 input their source operand information from general purpose architectural registers ("GPRs") 32 and fixed point rename buffers 34. Moreover, FXUA 22 and FXUB 24 input a "carry bit" from a carry bit ("CA") register 42. Also, CFXU 26 inputs and outputs source operand information and destination operand information to and from special purpose registers ("SPRs") 40.

FPU 30 inputs its source operand information from floating point architectural registers ("FPRs") 36 and floating point rename buffers 38. FPU 30 outputs results (destination operand information) of its operation for storage at selected entries in floating point rename buffers 38.

As is seen, the above-identified processor utilizes rename buffers and special purpose registers (SPRs) as a rename pool to keep track of the instructions. This use of a rename pool adds considerable complexity to the superscalar process, particularly as instructions become wider. To index instructions properly, it becomes important to optimize the translation from the complex instruction set with a large amount of implicit information to an explicit instruction set that does not require the use of architected registers. This is particularly true in situations where the internal instructions do not have a direct relationship to the external instructions. Hence, to index instructions properly, it is sometimes important to break those instructions into two instructions or several instructions that may not have a direct relationship to the original instruction to allow for faster execution of such instructions. Accordingly, a unique superscalar processor is provided which removes the rename buffering scheme and replaces it with a rename mapping arrangement.

Figure 2:
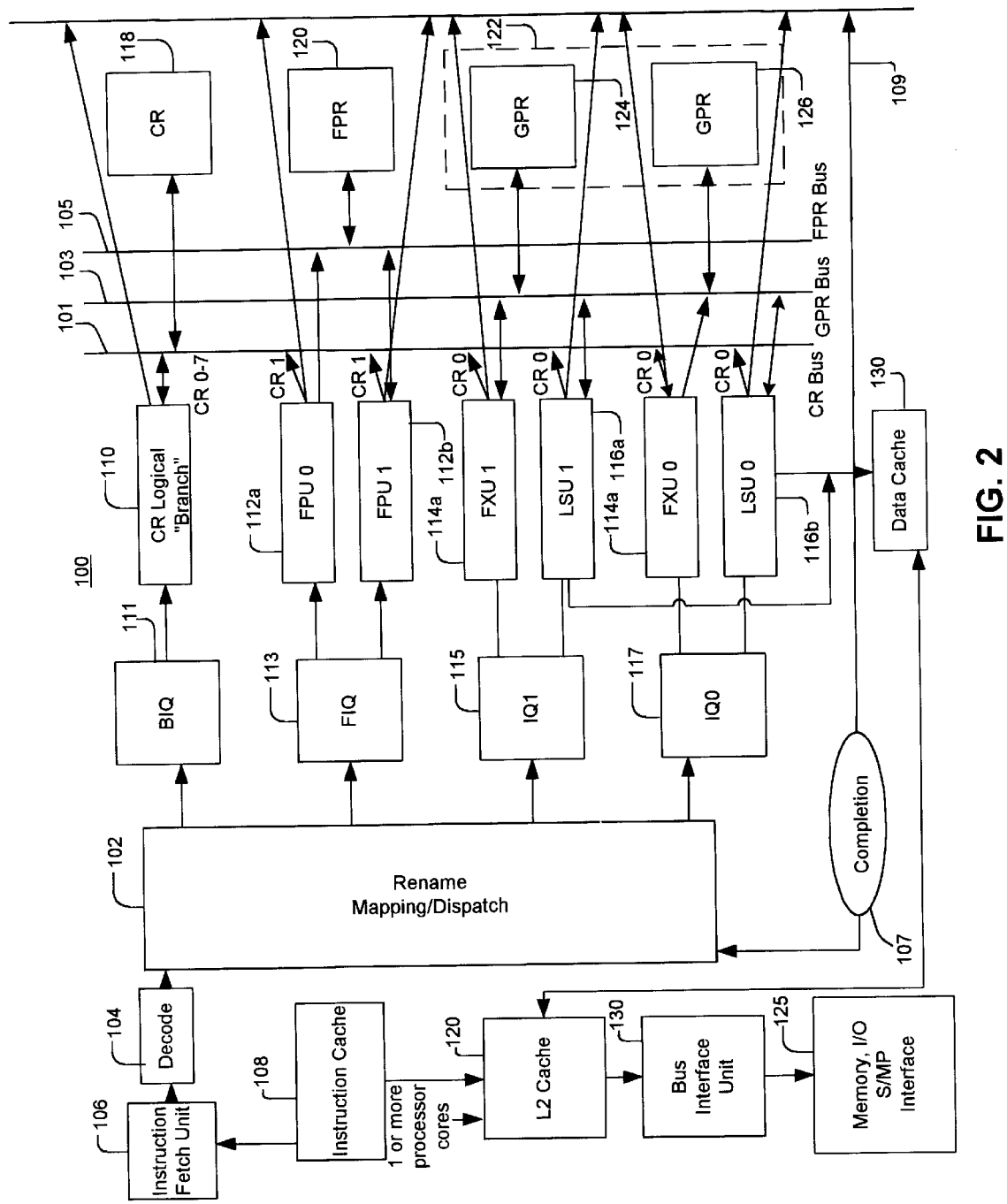
FIG. 2 is a block diagram of a superscalar processor in accordance with the present invention.
Figure 3:
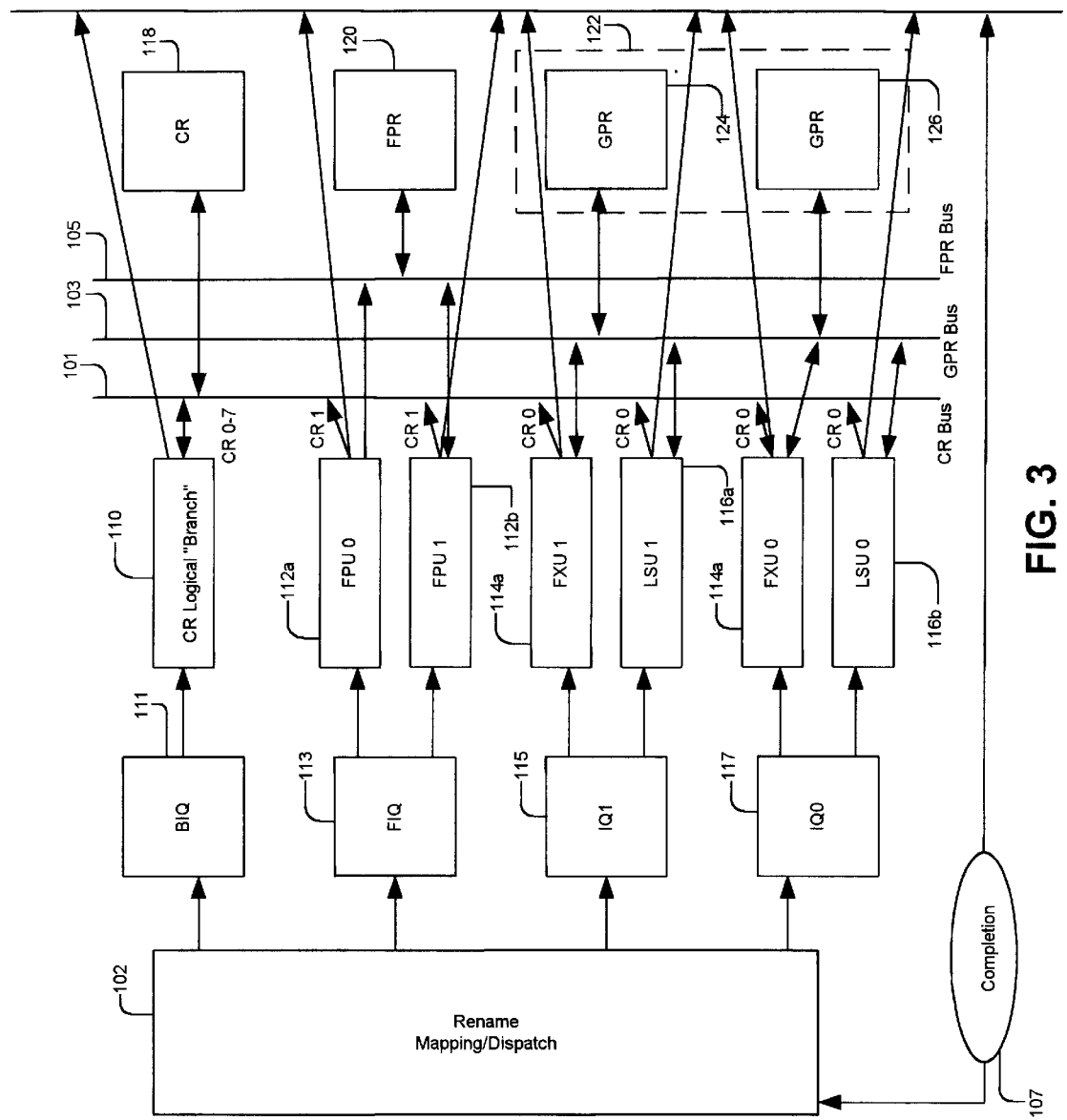
FIG. 3 is an enlarged block diagram illustrating certain portions of the superscalar processor of FIG. 2.

FIG. 2 is a simple block diagram of a superscalar processor 100 in accordance with the present invention. FIG. 3 is an enlarged block diagram illustrating certain portions of the superscalar processor of FIG. 2. The processor includes an instruction fetch unit (IFU) 106 which provides signals to a decode unit 104 which utilizes a rename mapping structure 102. That rename mapping structure 102 provides information directly to issue queues 111–117. The issue queues 111, 113, 115 and 117 in turn feed the execution units 110, 112a–b, 114a–b, and 116a–b.

Instruction cache 108 stores instructions received from the IFU 106. Data cache 130 receives data from the execution units 110–116. A level 2 (L2) cache 120 is utilized to store data and instructions from the data cache 130 and the instruction cache 108. The processor 100 includes a bus interface unit (BIU) 130 which passes information between the L2 cache 120 and the peripheral device interface 125 (i.e., memory, i/o device, mp).

In this embodiment, the branch issue queue (BIQ) 111 provides information to the condition register (CR) logical or branch unit 110. The floating point issue queue (FIQ) 113 provides information to the two floating point units (FPUs) 112a and 112b. Issue queue (IQ) 115 provide information to fixed point unit (FXU) 114a and load/store unit (LSU) 116.

IQ 117 provides information to FXU 114b and LSU 116b. Although the issue queues are arranged in the above-identified manner, one of ordinary skill in the art readily recognizes, that the issue queues can be arranged in a different manner and that arrangement would be within the spirit and scope of the present invention.

Conditional register 118 provides and receives information from a CR bus 101. Floating point architectural registers (FPRs) 120 provide and receive information from a FPR bus 105. General purpose registers (GPRs) 124 and 126 provide and receive information from a GPR bus 103. Completion unit 107 provides information to rename mapping 102 via a completion bus 109.

Branch unit 110 provides and receives information via the CR bus 101 utilizing in a preferred embodiment conditional registers 0–7 (CR0-7). FPU 112a and FPU 112b provides information to CR 118 via CR bus 101, utilizing in a preferred embodiment conditional register 1. FPU 112a and 112b also receive and provide information from and to FPR pool 120 via FPR bus 105. FXU 114a, FXU 114b, LSU 116a, LSU 116b output results to CR 118 via CR bus 101, utilizing in a preferred embodiment, conditional register 0. FXU 141a, FXU 146, LSU 116a and LSU 116b also receive and provide information from and to GPR pool 122 via GPR bus 103. GPR pool 122 in a preferred embodiment is implemented utilizing a shadow GPR arrangement in which there are two GPRs 124 and 126. All of the execution units 110–116 provide results to the completion unit 107 via completion bus 109.

Accordingly, with the processor in accordance with the present invention, increased throughput at higher instruction rates can be accomplished through an efficient accessing and translating of the instruction set associated with the processor.

To take full advantage of the operation of the processor 100 several features of the processor are optimized to allow for wider instruction fetches and dispatches while minimizing cycle time and the like. The instruction cache 108 fetches very wide data, for example, 8 instructions per cycle. In order to achieve the highest possible frequency the instruction cache 108 does not align the instruction data based upon the starting address.

In accordance with the present invention, an instruction buffer 300 is provided which can form dispatch groups spanning fetch boundaries while minimizing control complexity and wiring congestion within the processor. The instruction buffer, which in a preferred embodiment allows up to eight instructions to be loaded per cycle, any aligned group of four empty entries to be compressed out of the queue is within the decode unit 104, and allows advancing the buffer either zero entries, four entries, or eight entries per cycle (a fractional portion of the fetch width).

An example of this type of instruction buffer is described in copending U.S. Pat. application Ser. No. 09/263,667, entitled "An Instruction Buffer Arrangement for a Superscalar Processor," assigned to the assignee of this application and filed on even date herewith and is incorporated by reference herein.

Since the pipeline allows data to be read directly from the instruction cache it is not possible to determine if the data is a hit or miss prior to the information being sent to the decoder. Because of that another mechanism that utilizes the tagging scheme is utilized, which clears everything out of the instruction buffer.

The instruction fetch unit which processes branches in a processing system fetches instructions and forwards them to the decode unit 104 prior to determining how many branches are necessarily present in the fetch group. Additionally, redirect fetch flushes can confuse any type of tracking mechanism which attempts to keep the BTAGs being generated in the decode unit 104 synchronized with the BTAGs managed within the IFU 106.

The purpose of this mechanism is to provide a simple method where the IFU 106 can appropriately increment starting BTAG values for each fetch group. The mechanism also allows the decode unit 104 to generate the appropriate BTAG values for all dispatch groups formed from instructions found within the same fetch group.

In the preferred implementation, the BTAG values comprise a major branch tag and two minor branch tags, a count branch tag, and a link branch tag. The "seed" value for each of BTAGs is provided each time a branch redirection occurs. Because the branches are passed to the decode unit with little to no processing by the instruction fetch unit, and conditions can cause the branch execution to be delayed, more branches could be decoded and processed than the number of branch entry queues in the instruction fetch unit. Therefore the value of the next entry in the branch entry queue is broadcast to the decode unit and whenever the current branch in the last stage of the decode unit 104 is identical to the broadcast value, the decode unit 104 ceases to process and output instructions until the broadcast value changes. To describe the features of the present invention in more detail, refer now to the following discussion.

Figure 4:
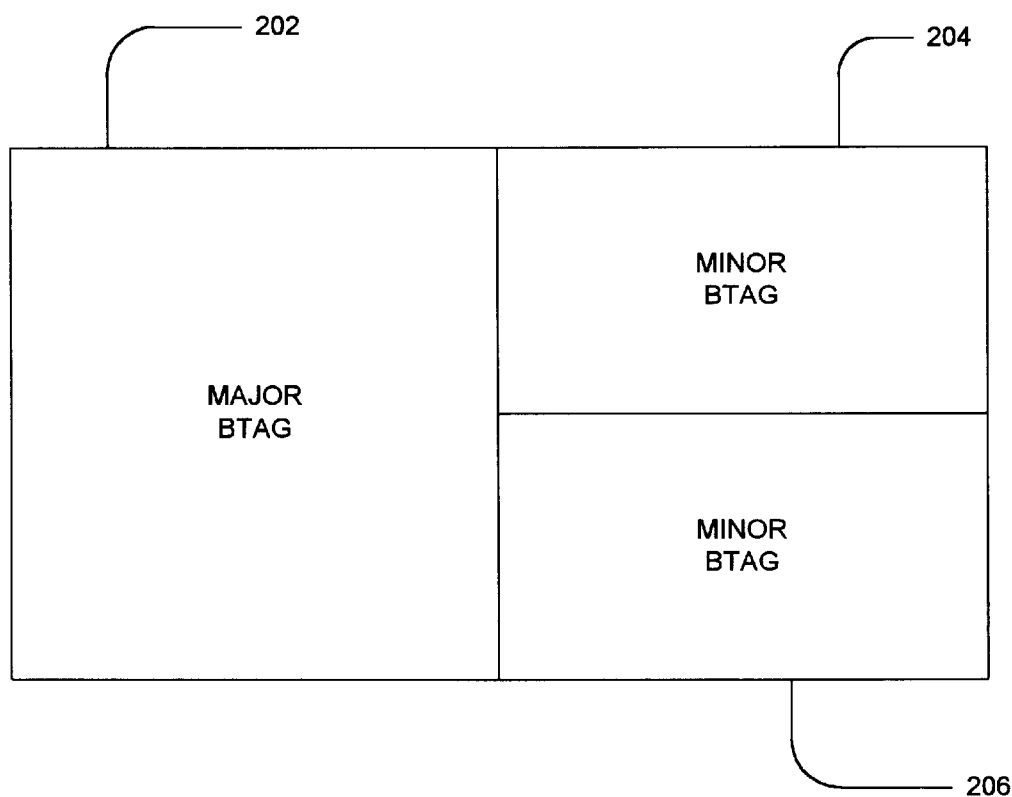
FIG. 4 illustrates the Major and Minor BTAG values.

After a reset of the processor, a completion flush is initiated. Thereafter, the instruction fetch unit 106 strobes in three pieces of information to decode unit 104, a Major BTAG 202 and two Minor BTAGs 204 and 206, shown in FIG. 4. The Major BTAG 202 points to a particular entry in the BIQ 111. In a preferred embodiment, one of the Minor BTAGs 204 and 206 is for the link register and the other is for a count register. In a preferred embodiment, the Major BTAG 202 is a four bit value and the two Minor BTAGS 204 and 206 are two bit values. These BTAGs 202, 204 and 206 load an initial value into the instruction buffer. Until another flush, which indicates new tags being loaded, groups of instructions flow down with the same BTAG values until a branch occurs. Any branch will cause the Major BTAG value to be incremented by one. Any branch-to-length or branch-to-count will be incremented separately. This is referred to as the TAG assignment. As an extension of the present invention, each fetch group could also cause the BTAG values to generate data.

The decode unit 104 and IFU 106 run independently. To prevent the decode unit 104 from decoding past the BIQ 111, a mechanism is provided that allows the decode unit 104 to pause and allow the IFU 106 to catch up. The next entry into the BIQ 111 is then broadcast. As an example, a BTAG feed allows both the IFU 106 and the decode unit 104 to be in lock step. Upon reset, the processor is flushed and a unique seed value for the BTAG is provided by the ISU.

A method and system for assigning unique branch tag (BTAG) values in a decode unit in a processing system is disclosed. The method and system comprises providing at least one BTAG value and incrementing the at least one BTAG value for each fetch group as required. The method includes allowing the decode unit to generate the appropriate BTAG values for all dispatch group formed by instructions within the same fetch group.

In the preferred implementation, the BTAG values comprise a major branch tag and two minor branch tags, a count branch tag, and a link branch tag. The "seed" value for each of BTAGs is provided each time a branch redirection occurs. Because the branches are passed to the decode unit with little or no processing by the instruction fetch unit, and conditions can cause the branch execution to be delayed, more branches could be decoded and processed than the number of branch entry queues in the instruction fetch unit. Therefore the value of the next entry in the branch entry queue is broadcast to the decode unit and whenever the current branch in the last stage of the decode unit is identical to the broadcast value, the decode unit ceases to process and output instructions until the broadcast value changes.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for assigning unique branch tag (BTAG) values in a decode unit in a processing system, the method comprising:

providing at least one BTAG value; and allowing the decode unit to generate the appropriate BTAG values for all dispatch groups formed by instructions within the same fetch group, wherein subsequent BTAG values generated are not necessarily linearly incremented, but are generated in a deterministic manner such that no more than one of any particular value can exist in the system at a time.

2. The method of claim 1 wherein the at least one BTAG value can be incremented for each dispatch group formed as an extension.

3. The method of claim 3 which includes the step of maintaining synchronized tag values in pipeline stages N stages apart.

4. The method of claim 1 which includes the step of preventing branches from being dispatched prior to an appropriate pipeline stage.

* * * * *

UNITED STATES PATENT AND TRADEMARK OFFICE
CERTIFICATE OF CORRECTION

PATENT NO. : 6,304,959 B1
DATED : October 16, 2001
INVENTOR(S) : Konigsburg et al.

It is certified that error appears in the above-identified patent and that said Letters Patent is hereby corrected as shown below:

Column 8,
Line 14, after claim, delete "3" and replace with -- 1 --.

Signed and Sealed this

Sixth Day of August, 2002

Attest:

JAMES E. ROGAN
Attesting Officer    Director of the United States Patent and Trademark Office